United States Patent Office 3,180,851
Patented Apr. 27, 1965

3,180,851
POLYMERS OF ETHYLENICALLY UNSATURATED DERIVATIVES OF ORTHO-HYDROXY AROMATICS
Albert I. Goldberg, Berkeley Heights, N.J., and Joseph Fertig and Martin Skoultchi, New York, N.Y., assignors to National Starch and Chemical Corporation, New York, N.Y., a corporation of Delaware
No Drawing. Filed Oct. 3, 1962, Ser. No. 228,021
5 Claims. (Cl. 260—47)

This invention relates to novel polymeric compositions and to the process for their preparation. More particularly, this invention relates to polymers and copolymers containing reactive sites useful for the conversion of said polymers into integrally colored compositions.

It is the prime object of this invention to provide polymeric compositions derived from vinyl monomers whose presence provides said polymeric compositions with means for effecting their subsequent coloration.

An additional object of this invention involves the preparation of polymers which may be utilized as chelating agents.

Polymer and copolymers derived from ethylenically unsaturated derivatives of aromatic nuclei having hydroxy groups substituted ortho to said ethylenically unsaturated groups have a number of interesting properties which have prompted further investigation leading to the preparation of additional polymers of this type. Thus, for example, British Patent 807,198 reports on the preparation of polymers from both vinyl and ally salicylate, while United States Patent 2,961,426 discloses the polymers derived from the ortho-acrylyl phenols.

In our copending applications Serial Nos. 219,112 and 219,119, both filed August 24, 1962, there are disclosed two novel classes of vinyl type monomers comprising, respectively, ethylenically unsaturated esters of ortho-hydroxy aromatic acids and ethylenically unsaturated ethers of ortho-dihydric phenols. For purposes of brevity, these derivatives will be, hereinafter, collectively referred to as "the ethylenically unsaturated derivatives of ortho-hydroxy aromatic compounds."

We have now discovered that a wide variety of polymers and copolymers may be prepared from these novel derivatives of ortho-hydroxy aromatic compounds. The products of our invention may thus be said to comprise those homo- and copolymers containing at least one ethylenically unsaturated derivative of an ortho-hydroxy aromatic compound which corresponds to the formula:

$$\left[ X \begin{array}{c} \phantom{x} \\ \phantom{x} \end{array} \begin{array}{c} -Y-R \\ -OH \end{array} \right]$$

wherein Y is a radical selected from among the group consisting of the oxy, i.e. —O—, and carboxy, i.e.

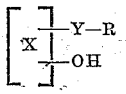

radicals; wherein X is a radical of the benzene series selected from among the group consisting of phenyl and naphthyl radicals having said —OH and —Y—R groups substituted thereon in positions which are ortho with respect to one another; and, wherein R is an ethylenically unsaturated radical selected from among the group consisting of beta-hydroxypropyl acrylate, i.e.

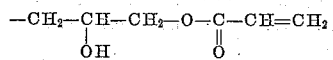

and beta-hydroxypropyl methacrylate, i.e.

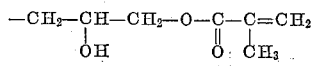

radicals.

The following list is representative of the above described monomers. For purposes of brevity, this list notes only the beta-hydroxypropyl acrylate derivatives; however, it is of course to be understood that the corresponding beta-hydroxypropyl methacrylate derivatives may also be utilized where so desired. One may thus list:

2-hydroxy-3-(2-hydroxy-benzoyloxy)propyl acrylate;
2-hydroxy-3-(1-hydroxy-2-naphthoyloxy)propyl acrylate;
2-hydroxy-3-(2-hydroxy-3-naphthoyloxy)propyl acrylate;
2-hydroxy-3-(2-hydroxy-1-naphthoyloxy)propyl acrylate;
2-hydroxy-3-(2-hydroxyphenoxy)propyl acrylate;
2-hydroxy-3-(1-hydroxy-2-naphthoxy)propyl acrylate; and,
2-hydroxy-3-(2-hydroxy-3-naphthoxy)propyl acrylate.

Thus, it is to be seen that the monomers which are essential for the preparation of our polymeric compositions may be described as ethylenically unsaturated derivatives of ortho-hydroxy aromatic compounds; or, more specifically, as the beta-hydroxypropyl acrylate and methacrylate esters of orthohydroxy aromatic acids and the beta-hydroxypropyl acrylate and methacrylate ethers of ortho-dihydric phenols.

Of great interest is the fact that the polymers of our invention possess a rather useful and unusual property. We have found that they may be reacted with diazonium salts so as to thereby provide these polymers with an integral or "built-in" color. In effect, by subjecting these polymers to the latter reaction, they are converted into what may be described as polymeric azo type dyes. Further details relating to the reaction with diazonium salts, of the novel polymers of our invention may be found in our copending application Serial No. 243,983, filed December 12, 1962, and assigned to the assignee of the present application.

Another useful property characteristic of the novel polymeric compositions of our invention resides in the fact that they may be utilized as chelating agents, i.e. they may be used to remove or scavenge metallic ions from aqueous solutions or from solutions of water soluble organic solvents.

The comonomers which may be utilized together with the above described ethylenically unsaturated derivatives of orthohydroxy aromatic compounds for the preparation of the novel polymeric compositions of our invention can be any ethylenically unsaturated monomer such, for example, as styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl, and stearyl alcohols; acrylic acid; isoprene; butadiene; methacrylic acid; acrylamide; acrylonitrile; methacrylonitrile; vinyl propionate; dibutyl maleate; dibutyl fumarate; vinylidene chloride; vinyl chloride; vinyl acetate; ethylene; and, propylene, etc. Any of these monomers may be used either alone or in combination with one another together with one or more of these ethylenically unsaturated derivatives of ortho-hydroxy aromatic compounds.

In order to provide copolymers which will function as chelating agents and, of greater importance, which will provide adequate reactive sites for subsequent reaction with diazonium salts, it is necessary that the copolymer contain at least about 0.1%, by weight, of these ethylenically unsaturated derivatives of ortho-hydroxy aromatic compounds. As for the maximum concentration, this will of course depend upon the particular comonomer as well as on the specific end use application of the resulting copolymer. However, in most cases a concentration of about 20%, by weight, will be fully adequate with economically useful results being obtained with a concentration in the range of about 2 to 5%.

As for the actual preparation of the homo- and copolymers of our invention, there may be employed any of the usual vinyl polymerization methods which are well known to those skilled in the art and which is particularly suited for the polymer whose preparation is desired. Thus, they may be prepared by means of free radical initiated processes utilizing bulk, suspension, solution, or emulsion polymerization techniques; or, they may be prepared by ionic catalysis or by means of sterospecific catalysts such as those of the type developed by Ziegler.

In any event, the homo- and copolymers of our invention, whether prepared by means of bulk, suspension, solution or emulsion polymerization techniques, or by other means, are all characterized by their ability to function as chelating agents and to provide active sites for subsequent reactions with diazonium salts so as to thereby convert these polymers into integrally colored compositions.

Our novel polymers may also be utilized for the preparation of films and coatings which may be cast on a variety of substrates, including wood, metal, leather, paper and textiles.

The following examples will further illustrate specific embodiments of this invention. In these examples, all parts given are by weight unless otherwise noted.

*Example I*

This example illustrates the preparation of one of the novel copolymers of our invention by means of an aqueous emulsion polymerization technique.

An aqueous latex of a 90:10:1.0 vinylidene chloride: ethyl acrylate:2 - hydroxy-3-(2-hydroxy-3-naphthoyloxy) propyl acrylate terpolymer was prepared by charging the following ingredients into a reactor equipped with a reflux condenser as well as with means for mechanical agitation.

| | Parts |
|---|---|
| Vinylidene chloride | 90.0 |
| Ethyl acrylate | 10.0 |
| 2 - hydroxy - 3-(2-hydroxy-3-naphthoyloxy)propyl acrylate | 1.0 |
| Sodium lauryl sulfate | 1.5 |
| Sodium dodecyl benzene sulfonate | 2.0 |
| Sodium bicarbonate | 0.3 |
| Sodium bisulfite | 0.2 |
| Ammonium persulfate | 0.25 |
| Water | 100.0 |

The above mixture was then refluxed at 33–55° C. for a period of 5 hours thereby resulting in a latex with a resin solids content of 50%, by weight, and an intrinsic viscosity, as determined in tetrahydrofuran at 30° C., of 0.82.

*Example II*

This example illustrates the preparation of one of the novel copolymers of our invention by means of a solution polymerization technique.

An ethyl acetate lacquer of a methyl acrylate:2-hydroxy-3-(2-hydroxy-benzoyloxy)propyl acrylate copolymer was prepared by charging the following ingredients into a reactor equipped with a reflux condenser as well as with means for mechanical agitation.

| | Parts |
|---|---|
| Methyl acrylate | 100.0 |
| 2 - hydroxy - 3 - (2 - hydroxy - benzoyloxy)propyl acrylate | 2.0 |
| Ethyl acetate | 150.0 |
| Benzoyl peroxide | 0.5 |

Under agitation, the above mixture was then refluxed at 78° C. for a period of 6 hours whereupon it was allowed to cool and discharged from the reactor. The resulting lacquer had a resin solids content of 39.8%, by weight, indicating a conversion of 99.0%.

*Example III*

This example illustrates the preparation of another of our novel copolymers by means of a solution polymerization technique.

A toluene lacquer of a styrene: 2-hydroxy-3-(2-hydroxy-benzoyloxy)propyl methacrylate copolymer was prepared by charging the following ingredients into a reactor equipped with a reflux condenser as well as with means for mechanical agitation.

| | Parts |
|---|---|
| Styrene | 100.0 |
| 2 - hydroxy-3-(2-hydroxy-benzoyloxy)propylmethacrylate | 20.0 |
| Tertiary butyl hydroperoxide | 0.5 |
| Toluene | 150.0 |

Under agitation, the above mixture was then refluxed at 110° C. for a period of 6 hours whereupon it was allowed to cool and discharged from the reactor. The resulting lacquer has a resin solids content of 41.7%, by weight, indicating a conversion of 94%.

*Example IV*

This example illustrates the preparation of another of the novel copolymers of our invention by means of an aqueous emulsion polymerization technique.

An aqueous latex of a 75:25:2 vinylidene chloride:butyl acrylate:2-hydroxy-3-(2-hydroxyphenoxy)propyl acrylate terpolymer was prepared by charging the following ingredients into a pressurized reactor.

| | Parts |
|---|---|
| Vinylidene chloride | 75.0 |
| Butyl acrylate | 25.0 |
| 2-hydroxy-3-(2-hydroxyphenoxy)propyl acrylate | 2.0 |
| Octyl phenoxy polyoxyethylene ethanol | 7.5 |
| Sodium lauryl sulfate | 2.0 |
| Ammonium persulfate | 0.4 |
| Water | 168.0 |

The above mixture was then maintained at a temperature of 70° C. for a period of 8 hours resulting in a latex with a resin solids content of 37.3%, by weight, and which had an intrinsic viscosity, as determined in tetrahydrofuran at 30° C., of 0.88.

*Example V*

This example illustrates the preparation of one of the novel homopolymers of our invention by means of a solution polymerization technique.

An ethyl acetate lacquer of the homopolymer of 2-hydroxy-(2-hydroxy-benzoyloxy)propyl acrylate was prepared charging the following ingredients into a reactor equipped with a reflux condenser as well as with means for mechanical agitation.

| | Parts |
|---|---|
| 2-hydroxy-3-(2-hydroxy-benzoyloxy)propyl acrylate | 40.0 |
| Ethyl acetate | 60.0 |
| Benzoyl peroxide | 0.2 |

Under agitation, the above mixture was then refluxed at 78° C. for a period of 6 hours whereupon it was allowed to cool and discharge from the reactor. The resulting lacquer had a resin solids content of 38%, by weight, indicating a conversion of 95%.

*Example VI*

This example illustrates the chelating ability of one of the novel polymers of our invention.

A portion of the methyl acrylate:2-hydroxy-3-(2-hydroxybenzoyloxy)propyl acrylate copolymer lacquer, whose preparaiton was described in Example II, was diluted with acetone so that the resulting solution had a resin solids content of 33%, by weight. To 300 parts of this copolymer solution, there was then added a solution of 0.75 part of cupric acetate monohydrate in 7.5 parts of a 1:1 mixture of acetone and water. Films having a wet thickness of 12 mils were thereupon cast from the resulting homogeneous solution which, as will be shown, contained the soluble complex of the cupric acetate and the copolymer of our invention.

After being dried for 0.5 hour at a temperature of 120° C., it was found that the thus formed films were insoluble in acetone. The fact that these films were insoluble in acetone was indicative of the presence therein of the chelate inasmuch as comparable films derived from a sample of the copolymer lacquer to which none of the cupric acetate solution had been added were found, in contrast, to be soluble in acetone after having been subjected to the identical drying conditions.

Although the above disclosure is seen to encompass the preparation of polymers from both ortho-hydroxy aromatic acids and ortho-dihydric phenols having either a phenyl or naphthyl nucleus, it is of course to be understood that compounds of this type having phenyl or naphthyl nuclei which have been substituted as for example, with low molecular weight hydrocarbon groups, may also be utilized in preparing the novel polymers of our invention.

It should also be pointed out that although the process of our invention has been limited to the polymerization of the reaction products of ortho-hydroxy aromatic acids or ortho-dihydric phenols with either glycidyl acrylate or glycidyl methacrylate, it is to be noted that one may also, if desired, prepare comparable polymers utilizing, as monomers therefor, the reaction products of the ortho-hydroxy aromatic acids or the ortho-dihydric phenols with such reagents as allyl glycidyl ether, butadiene monoxide, glycidyl crotonate, or the glycidyl alkyl maleates as well as any other available epoxides having ethylenically unsaturated linkages.

Summarizing, our invention is thus seen to provide the practitioner with a novel class of polymers. Variations may be made in proportions, procedures and materials without departing from the scope of this invention as defined by the following claims.

What is claimed is:

1. A composition comprising a polymer of at least one ethylenically unsaturated monomer together with at least one ethylenically unsaturated ortho-hydroxy aromatic compound selected from the group consisting of:

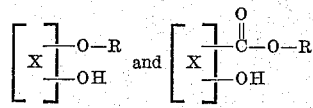

wherein X is a radical of the benzene series selected from the group consisting of phenyl and naphthyl radicals having said —O—R and

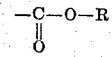

groups respectively substituted thereon in positions which are ortho with respect to said —OH group; and, wherein R is an ethylenically unsaturated radical selected from the group consisting of beta-hydroxypropyl acrylate and beta-hydroxypropyl methacrylate radicals; wherein said ethylenically unsaturated monomer is selected from among the group consisting of styrene, alpha-methyl styrene, the acrylic and methacrylic esters of aliphatic alcohols, acrylic acid, isoprene, methacrylic acid, butadiene, acrylamide, acrylonitrile, methacrylonitrile, vinyl propionate, dibutyl maleate, dibutyl fumarate, vinylidene chloride, vinyl chloride, vinyl acetate, ethylene and propylene.

2. The composition of claim 1, wherein said ethylenically unsaturated derivative of an ortho-hydroxy aromatic moiety is present in a proportion of at least 0.1%, by weight.

3. A composition in accordance with claim 2, in which vinylidene chloride and ethyl acrylate are polymerized with 2 - hydroxy - 3-(2-hydroxy-3-naphthoyloxy)propyl acrylate.

4. A composition in accordance with claim 2, in which methyl acrylate is polymerized with 2-hydroxy-3-(2-hydroxy-benzoyloxy)propyl acrylate.

5. A composition in accordance with claim 2, in which styrene is polymerized with 2-hydroxy-3-(2-hydroxy-benzoyloxy)propyl methacrylate.

References Cited by the Examiner

UNITED STATES PATENTS

| | | | |
|---|---|---|---|
| 2,765,224 | 10/56 | Lambrech | 260—47 |
| 2,938,883 | 5/60 | Raich | 260—45.95 |
| 3,067,222 | 12/62 | Anderson | 260—474 |
| 3,107,199 | 10/63 | Tocker | 260—47 |

WILLIAM H. SHORT, *Primary Examiner.*